Figure 1:
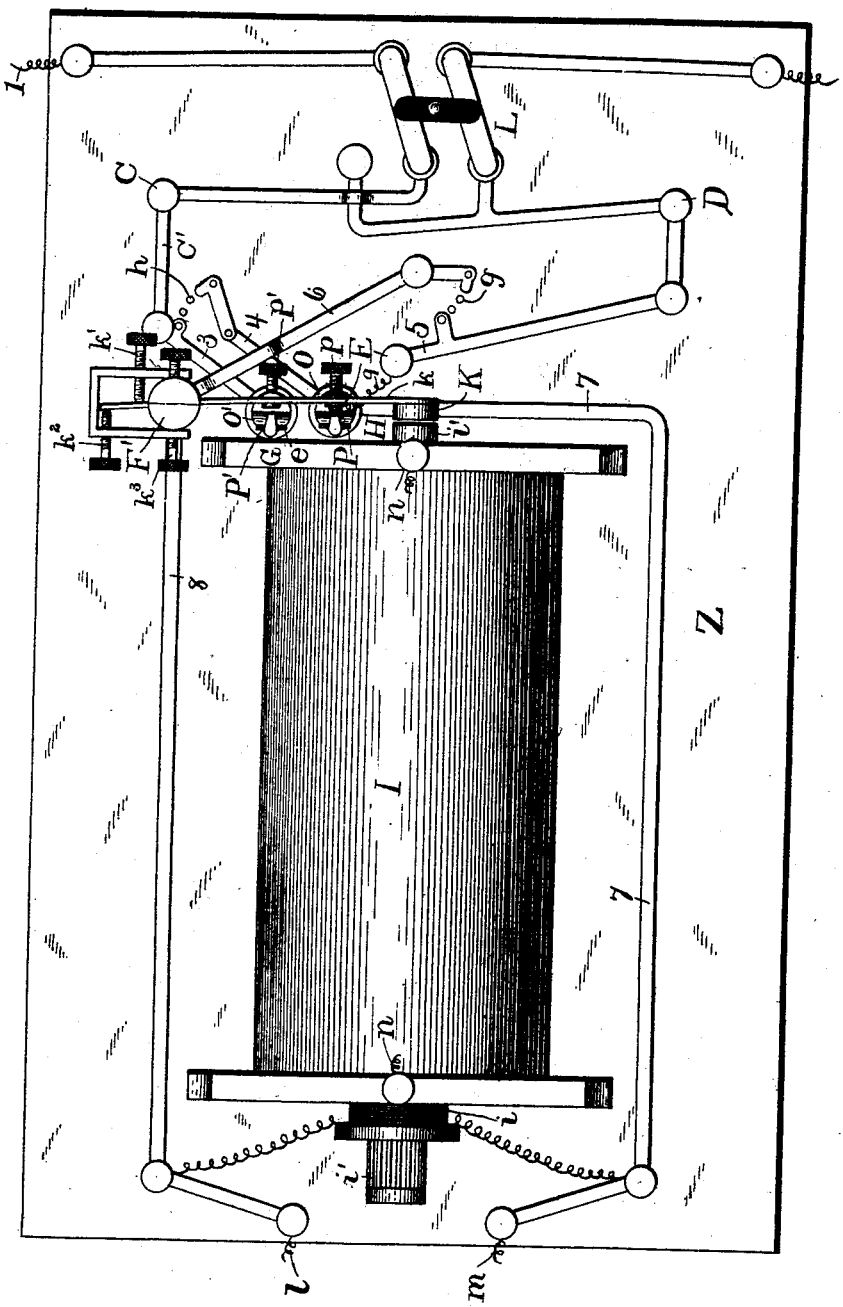

No. 716,653. Patented Dec. 23, 1902.
J. P. ALEXANDER.
BALANCED CIRCUIT INDUCTION COIL.
(Application filed Mar. 21, 1898.)
(No Model.) 3 Sheets—Sheet 1.

Witnesses
D. H. Blakelock
H. L. Hodgkins

Inventor
John P. Alexander
By Frankland Jannus
his Attorney

No. 716,653. Patented Dec. 23, 1902.
J. P. ALEXANDER.
BALANCED CIRCUIT INDUCTION COIL.
(Application filed Mar. 21, 1898.)
(No Model.) 3 Sheets—Sheet 2.
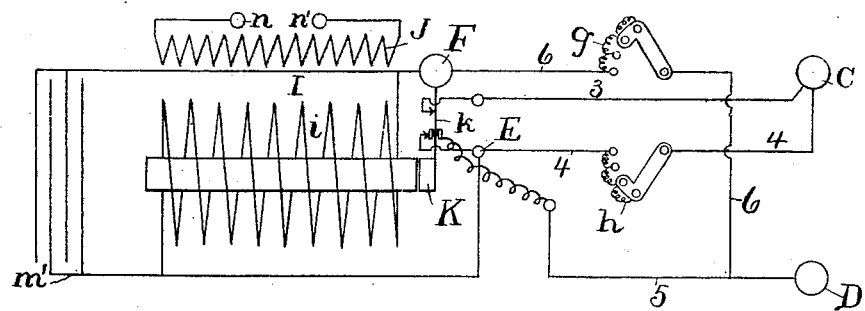
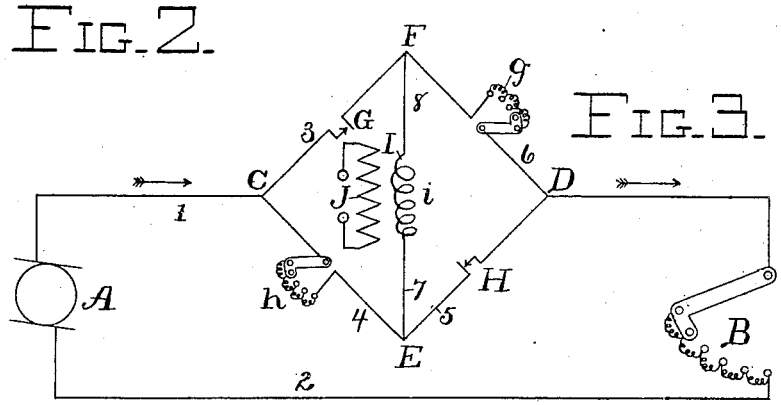
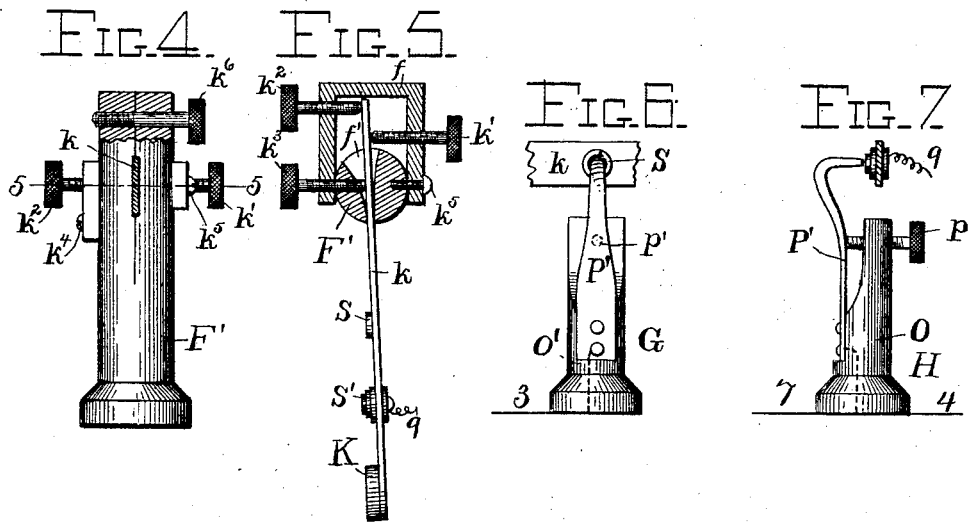
Witnesses
D. H. Blakelock
H. C. Hodgkins
Inventor
John P. Alexander
By Frankland Jannus
His Attorney No. 716,653. Patented Dec. 23, 1902.
J. P. ALEXANDER.
BALANCED CIRCUIT INDUCTION COIL.
(Application filed Mar. 21, 1898.)
(No Model.) 3 Sheets—Sheet 3.
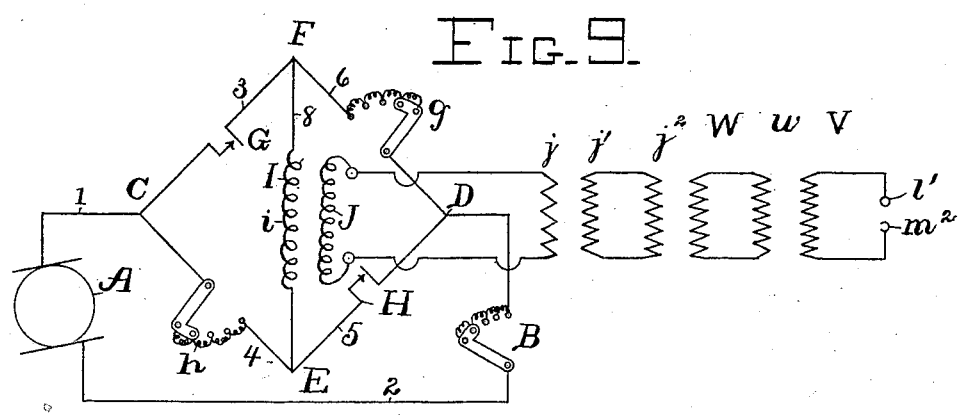
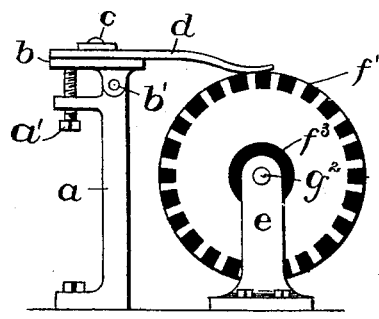
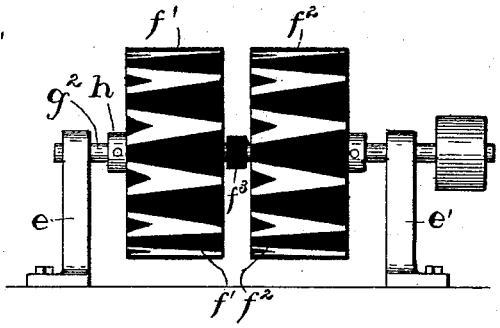
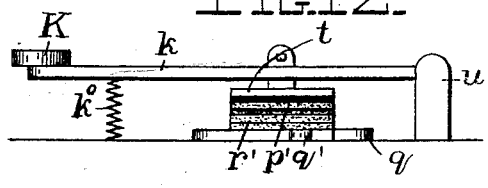
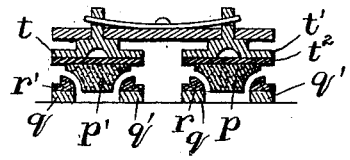
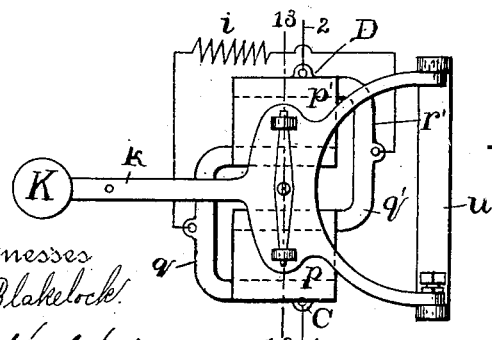
Witnesses
L. H. Blakelock.
H. L. Hodgkin.
Inventor
John P. Alexander.
By Frankland Jannus
his Attorney
THE NORRIS PETERS CO., PHOTO-LITHO., WASHINGTON, D. C.

UNITED STATES PATENT OFFICE.

JOHN P. ALEXANDER, OF JACKSON, TENNESSEE.

BALANCED-CIRCUIT INDUCTION-COIL.

SPECIFICATION forming part of Letters Patent No. 716,653, dated December 23, 1902.

Application filed March 21, 1898. Serial No. 674,658. (No model.)

*To all whom it may concern:*

Be it known that I, JOHN P. ALEXANDER, a citizen of the United States of America, and a resident of the city of Jackson, county of Madison, and State of Tennessee, have invented certain new and useful Improvements in Balanced-Circuit Induction-Coils, of which the following is a specification.

My invention relates more particularly to the conversion of a continuous electric current into alternating currents of higher or lower tension by means of induction-coils.

Induction-coils have heretofore been used in many and various combinations; but according to my invention I so arrange the primary circuits of one or more induction-coils with relation to the line conductors that the primary of the induction-coil forms a bridge across a divided and balanced circuit in the branches of which suitable balancing resistances and circuit-breakers are connected. The primary of the induction-coil is connected across a divided and balanced circuit, and I am thereby enabled to send the current through the induction-coil or through the united branches of the divided circuit without interrupting the flow of the supply-current, while at the same time charging and discharging the primary coil, so as to secure inductive reaction upon a secondary and from it to other circuits or translating devices. The well-known effect of the breaking of the primary circuit prevents the use of currents of large volume or high potential, because of the destructive sparks or arcs at the points of contact. By my invention of the balanced circuit, which will be hereinafter described, it is possible to partially eliminate the above disadvantages, thereby greatly extending the possibilities of the induction-coil in the production of large currents and high voltages.

The balanced-circuit induction-coil furnishes a means of utilizing the magnetic whirl set up in space by a current moving in a conductor. In a commercial circuit by its use as a continuous-current transformer it is possible to thus secure in the secondary of the coil an induced and alternating current without breaking the commercial circuit or throwing in very much extra resistance. Of course it is evident that the usual transformer losses will be met with, since the induced current will imply the accompanying phenomena. The entire supply of the source of continuous current can by my system of balanced circuits be utilized in the primary of a transformer, the circuits being unbalanced by mechanical, magnetic, induced, or other means which will allow a circulation of the continuous current in the primary coil placed in the circuit between the balanced points and the consequent production of an induced current in the secondary. It is also possible by the use of the same original current to operate or control two coils with the same interrupter or circuit-shifting device, producing two alternating currents differing in phase. This form, or, rather, this use, of the device will allow the vibrator, if its inertia is proportionately chosen, to vibrate with rapidities impossible if the elasticity of the spring alone be depended upon. The best conception of this form of the device can be had if a complete coil be placed with its vibrator next the end of a second coil, both coils being operated by the same coil-vibrator or current-shifting device.

In the accompanying drawings, Figure 1 is a plan view of the induction-coil and its balanced-circuit connections. Fig. 2 is a diagrammatic view of an arrangement similar to that shown in Fig. 1 with the addition of a condenser. Fig. 3 is a theoretical diagram showing the invention applied to a working circuit. Fig. 4 is an elevation, partly in section, showing the post carrying the vibrating spring. Fig. 5 is a sectional view thereof on the lines 5 5, Fig. 4. Fig. 6 is a view in elevation of one of the posts carrying an adjustable contact. Fig. 7 is a side elevation on a post similar to that shown in Fig. 6, carrying another spring-contact point. Fig. 8 is an enlarged sectional detail of one of the contacts carried by the vibrating spring. Fig. 9 is a diagrammatic view showing my invention as applied to a working circuit and also extended to include a series of induction-coils. Figs. 10 and 11 are detailed views, on an enlarged scale, showing, respectively, a side elevation and an end view of a rotary circuit-breaker. Fig. 12 is a side elevation of another form of circuit-breaker. Fig. 13 is a cross-sectional view on the line 13 13 of Fig. 14. Fig. 14 is a plan view of the circuit-breaker shown in Fig. 12.

Referring to the drawings, as seen in Fig. 3, the circuit in which my balanced-circuit induction-coil is included is indicated by the conductors 1 2, which extended from the commutator-brushes of a continuous-current generator A.

A working resistance, which may be translating devices, is indicated conventionally at B between the points C and D. The main conductor 1 is divided into two branches 4 5 and 3 6. The two sides of this divided circuit is further indicated by the reference-letters E F. Between the points E and F is placed a primary coil $i$ of an induction device, which may be any well-known type of induction-coil or transformer, the ends of which are connected by conductors 7 8, so as to connect or bridge the divided portions of the main circuit at E and F.

The secondary coil of the transformer or induction-coil is indicated at J.

Each one of the parallel subdivisions of the main conductor 3 5 is provided with a circuit-breaker G H, and in opposite relation thereto in the other portions 4 6 of the divided circuit are located variable resistances $g$ $h$. The contacts G H being mechanical or any known method of completing a circuit in wires will offer changing resistances to the passage of current due to uneven wear, motion, oxidation, and in any case in actual construction will fall short of theoretically perfect contact. Consequently variable resistances $g$ $h$, easily adjustable and set in the balanced branches of the circuit, are useful in balancing any inequalities due to the aforementioned causes and are here mentioned as a means of arriving at a fair balance of flowing currents without unusual constructions to accomplish that end. It is to be further understood that the resistances of the balanced circuits and of the primary coil spanning said circuits is to be as small in proportion to the exterior circuit as possible, so as to render the difference of potential as low as possible between the beginning and end of the balanced parts of the circuit.

In operation, assuming the circuit-breakers G H to be closed, the current which is continuously flowing in the conductor 1 will divide at C and pass around by way of conductors 3 4 5 6 to the point D, there uniting, and if the resistance of the two halves of the circuit 3 4 5 6 be equal it will pass equally therethrough, as is intended. If, however, the circuit-breakers G H be opened, the current will at the point C be diverted through resistance $h$, point E, conductor 7, primary coil $i$, conductor 8, point F, resistance $g$, and conductor 6 to the point D, and it will continue to flow through this path until the circuits of conductors 3 5 are again closed at G and H, when it will be merely diverted and pass around the coil $i$ by way of the divided circuit. As will appear, the coil $i$ is provided with a core which acts upon an armature controlling the action of the circuit-breakers G H.

Referring now to Fig. 1, in this figure the conductors are shown the same as in the diagram Fig. 3, except that they here appear as strips of conducting material arranged upon a suitable base Z. In said Fig. 1, however, I have provided a reversing-switch L of a well-known type by which the energizing-current may direct through the apparatus in reverse relation whenever desired.

The circuit-breakers G H in Fig. 1 are indicated as mounted upon metallic or other posts O O', which are shown in detail in Figs. 6 and 7. At the point corresponding with F in the diagram Fig. 3 is placed a third post F', in which is secured a vibrating spring $k$, which is provided at its free end with an iron armature K, in inductive proximity to one extremity of the core $i'$ of the induction-coil $i$.

As seen in Fig. 1, the primary coil $i$ is normally connected across the divided circuit between the points C D through conductor C', low resistance $h$, conductor 4, the base of circuit-breaker H, and the conducting-strip 7, which connects with one terminal of the induction-coil $i$. From the induction-coil $i$ by its other terminal it is connected by conducting-strip 8 to the base of post F', thence by conducting-strip 6, low resistance $g$, and conducting-strip 5 to the point D. The spring $k$ carries two contacts S S', which should be of platinum or other durable conducting material. That portion of the spring K between the contact $s$ and the post F' serves as a conductor when the spring is drawn by its armature K. The other contact S' is insulated from said spring and connected by a short piece of flexible conductor 9 with the point E, which occupies the same electrical relation to the coil $i$ as in the diagram Fig. 2. When the core $i'$ of the primary coil $i$ is energized and draws its armature K, then the post F' is placed in electrical connection with the conductor 3 through the circuit-breaker G, to which is connected conductor 3, the spring-contact P', and the platinum or other metallic connections secured to the spring $k$, and the spring $k$ itself, which is here used as a conductor. The circuit-breaker H comprises a post O and contact-spring P, which is in electrical connection with conductor 4. The contact S', which engages this spring, is, however, insulated from the mainspring $k$, as indicated on enlarged scale in Fig. 8, and said contact S' is connected by a flexible conductor 9 with the conducting-strip 5, completing the circuit.

The posts O O' of circuit-breakers G H (seen in Figs. 6 and 7) are provided with contact-springs P P' of any suitable material for the purpose. Said springs are adjustable by thumb-screws $p$ $p'$, passing through said posts and engaging the springs. The post F', which carries the mainspring, is preferably slitted and formed with a flaring recess to accommodate the adjustment of the inner end of the spring $k$, which is then clamped in position by a thumb-screw $k^6$, which passes through the upper end of said post, drawing the parts together. A yoke $f$ is placed about the post, surrounding the inner end of the spring, and I provide set-screws $k'$ $k^2$ $k^3$, by which the same is firmly clamped with its outer or free end in the desired relation to the end of the induction-coil.

Fig. 2 shows the arrangement of Fig. 1 diagrammatically, the condenser $m'$ being also indicated as included between the terminals $l$ $m$ of said Fig. 1. Since my invention does not prohibit the use of this device, it may be employed whenever desired in a circuit where it can advantageously be used.

Various forms of circuit-breakers may be used, the type selected depending upon the character of the currents employed. Said circuit-breakers may also be of the rotary as well as the reciprocating type, a form of such being shown in Figs. 10 and 11, which are respectively side elevations and front view of a rotary circuit-breaker comprising two rollers $f'$ $f^2$, mounted on shaft $g^2$ and moving synchronously when said shaft is rotated by any suitable motor. The rollers $f'$ $f^2$ are of metal, formed, preferably, with V-shape slots filled with insulating material, as indicated in Fig. 10. The shaft $g^2$ is sustained in suitable bearings $e$ $e'$, which may act as terminals or binding-posts, the current passing through the bearings $e$ $e'$, axle $g^2$, and circuit-breaking wheels $f'$ $f^2$, which are also separated by an insulating-section $f^3$ between them. Suitable contact-brushes $d$ engage the peripheral surfaces of each roller, and said brushes are desirably mounted upon standards $a$, upon a hinged support $b$, where they are adjusted by screws $a'$.

In Figs. 12, 13, and 14 are illustrated a compact form of double circuit-breaker specially designed for employment in connection with heavy currents. This device comprises two interlapping U-shaped plates $q$ $q'$, to which the circuit-conductors are connected, as indicated. Between the arms of the interlapping plates $q$ $q'$ are two vertically-moving contact or bridge blocks $t$ $t'$. These bridge-blocks are preferably formed of metal faced with carbon $p$ $p'$ and are fitted to present large surfaces of contact to correspondingly-formed flaring edges $r'$ upon the plates $q$ $q'$. The bridge-blocks are connected to but insulated by $t^2$ from a pivoted lever $k$, which is the vibrating part and corresponds to the spring $k$ and is provided with an armature K, which is acted upon by the core of the primary coil $i$ to make and break the paths of the electrical current through or around the primary of the induction-coil, as heretofore described.

In Fig. 9 is shown the use of the balanced-circuit induction-coil in connection with a train of coils for increasing or lowering the potential, as by transformer methods in induced-current practice. The terminals of the secondary coil J are connected directly to a coil $j$, which is arranged to be the primary for coil $j'$, which is in inductive relation thereto. Similarly the said coil $j'$ is connected to and supplies coil $j^2$, which serves as primary to another secondary coil W, placed in inductive relation. The secondary coil W is connected with coil $w$, which in like manner acts as primary to another secondary coil V, the terminals of which latter are indicated at $l'$ $m^2$ and may be connected to other circuits or translating devices, as desired. As far as the secondary is concerned the action of the coils is as already described. I will consequently explain the action from that point on. The current from the secondary coil J becomes the primary current circulating in the coil $j$. In turn this acts inductively and produces a current in the next secondary coil $j'$, inducing a current in the next primary $j^2$, which again, through the action of the next secondary W, produces a primary current in $w$ and a final induced current in secondary V. It is obvious that any number of coils could be thus connected up. The points $l'$ and $m^2$ in diagram are, Fig. 9, the final discharging-points of the last induced current.

While I have pointed out several desirable constructions by use of which my invention will be carried into effect, it must be understood that the form and construction of the apparatus may be greatly varied without in any way departing from the invention or without the exercise of invention by persons skilled in the art, and I therefore do not limit myself to the precise details set forth.

Having described my invention, what I claim, and desire to secure by Letters Patent, is—

1. The combination with a continuous-current circuit of a branch containing a circuit-breaker and a branch containing the primary coil of an induction apparatus, said branches being of substantially balanced resistances and means for diverting the main supply-current alternately through some of the respective branch circuits without interrupting its flow.

2. The combination with a working circuit traversed by a continuous current, of substantially balanced branches or subdivisions thereof, an induction-coil spanning said branches and means for diverting the current through the induction-coil and away from some of the branches, then through the branches and away from the induction-coil to energize the said coil intermittently, thereby producing inductional effects.

3. The combination with a working circuit traversed by a continuous current, of two balanced branches thereof, an induction-coil connected across the said branches at points of equal potential and means for diverting the current from some of the branches and through said induction-coil and then into the branches around said induction-coil without interrupting the flow of current in the main circuit.

4. The combination with a working circuit supplied by current of continuous direction, of two branches dividing said current and means for substantially equalizing the resistance of the parts of said divided circuit, an induction-coil connected across and bridging the divided main circuit at points of equal potential and means for opening alternate and opposite portions of the divided circuit and diverting the current through the primary of the induction-coil and for closing said breaks and restoring the current to the branches, thereby arresting the flow of current through the induction-coil.

5. The combination with a working circuit a portion of which is divided into parallel branches of substantially balanced capacity all supplied with currents of continuous direction, of translating device in said circuit and an induction-coil connected across and bridging the divided portion of said circuit at points of equal potential, adjustable resistances in the branches of the divided circuit and circuit-breakers also in each branch and means for operating the circuit-breaker simultaneously to open and close the branch circuits thereby energizing and discharging the primary of the induction-coil.

6. The combination with the main circuit supplied with current of continuous direction, of the branch conductors, 3, 6 provided with a circuit-breaker and with an equalizing-resistance, the corresponding branch 4, 5 also provided with an equalizing-resistance and with a circuit-breaker, and the circuit 7, 8 spanning said conductor at points of equal potential and including the primary of an induction-coil, and means for opening the circuit-breakers and thereby directing the main current through the said primary coil and for closing them and restoring the current to the divided main circuit, thereby diverting it away from said coil.

7. The combination of a working circuit traversed by a continuous current and subdivided into a number of branches of substantially equal resistance, an induction-coil connected across the said branches at points of equal potential and means, as circuit-breakers, for diverting the continuous current from the branches and through the primary of said induction-coil and for then closing the gaps in the said branches and diverting the current around said induction-coil, a primary coil in circuit with the secondary of said induction-coil, and an additional primary coil or coils in inductive relation thereto and energized by the inductive effect of said first primary coil.

8. The combination with a working circuit traversed by a continuous current, of the primary of an induction-coil connected across a divided portion of said circuit at points of equal potential and energized intermittently by the continuous current therefrom, without interrupting the flow of the main current, and a second primary coil connected to receive the secondary currents from the induction-coil, and a series of like induction devices in inductive relation thereto, whereby the current induced in the secondary coil of the first induction device is transmitted to the primary coil of the second and thence throughout the series.

9. The combination with a divided or split supply-circuit traversed by continuous current, of an induction-coil and connections from the terminals of the primary thereof spanning the split circuit at points of equal potential, duplex circuit-breakers for opening and closing each of the branches of the split circuit and comprising a spring-controlled vibrating part provided with an armature within the magnetic field of the core of the induction-coil and duplex adjustable contact-points adapted to open or close the divided circuit in accordance with the energizing and the de-energizing of the induction-coil.

10. A duplex-circuit breaker comprising a pair of substantially "U"-shaped conductors arranged to interlap and provided with a facing of carbon or similar conducting material at their edges—bridge-blocks adapted to fit between the adjacent edges of the interlapping conductor to close the circuit or circuits between them and also faced with carbon or similar conducting material, a lever connected to and insulated from the bridge-blocks, and adapted to move them simultaneously into and out of contact with the corresponding edges of the said interlapping conductors, and means for operating the lever as desired.

11. A duplex-circuit breaker comprising a pair of substantially "U"-shaped conductors arranged to interlap and provided with a facing of carbon or similar conducting material at their edges—bridge-blocks adapted to fit between the adjacent edges of the interlapping conductor to close the circuit or circuits between them and also faced with carbon or similar conducting material, a pivoted lever connected to the bridge-blocks and adapted to move them simultaneously into and out of contact with the corresponding edges of the interlapping conductors, said lever provided with a retracting-spring and with an armature adapted when placed within the field thereof to be actuated by the core of an induction-coil or the like.

Signed by me at Washington, District of Columbia, this 21st day of March, 1898.

JOHN P. ALEXANDER.

Witnesses:
WM. E. HARVEY,
E. T. GILMAN.